US009565607B2

(12) United States Patent
Jang et al.

(10) Patent No.: US 9,565,607 B2
(45) Date of Patent: *Feb. 7, 2017

(54) METHOD AND APPARATUS FOR PERFORMING HANDOVER IN A WIRELESS COMMUNICATION SYSTEM

(71) Applicant: Samsung Electronics Co., Ltd., Suwon-si, Gyeonggi-do (KR)

(72) Inventors: Jae-Hyuk Jang, Suwon-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,760

(22) Filed: Mar. 10, 2014

(65) Prior Publication Data

US 2014/0194122 A1  Jul. 10, 2014

Related U.S. Application Data

(63) Continuation of application No. 13/169,264, filed on Jun. 27, 2011, now Pat. No. 8,682,330.

(30) Foreign Application Priority Data

Jun. 25, 2010  (KR) .................. 10-2010-0060437

(51) Int. Cl.
*H04W 36/22* (2009.01)
*H04W 36/00* (2009.01)
*H04W 36/08* (2009.01)

(52) U.S. Cl.
CPC ......... *H04W 36/22* (2013.01); *H04W 36/0077* (2013.01); *H04W 36/08* (2013.01)

(58) Field of Classification Search
CPC ............ H04W 36/00; H04W 36/0072; H04W 36/0077; H04W 36/0005
USPC ................................. 455/436–444
See application file for complete search history.

(56) References Cited

U.S. PATENT DOCUMENTS

| 7,693,517 B2 | 4/2010 | Etemad et al. |
| 9,241,291 B2* | 1/2016 | Park .................. H04W 36/0077 |
| 2006/0035639 A1* | 2/2006 | Etemad et al. ............... 455/436 |
| 2008/0132560 A1 | 6/2008 | Chow et al. |

(Continued)

FOREIGN PATENT DOCUMENTS

| JP | 2009-111493 A | 5/2009 |
| KR | 10-2009-0133066 A | 12/2009 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP E-UTRAN TS, 36.300 v10.0.0 (Jun. 2010), Jun. 18, 2010.

*Primary Examiner* — Nathan Mitchell
(74) *Attorney, Agent, or Firm* — Jefferson IP Law, LLP

(57) ABSTRACT

An operating method of a serving Base Station (BS) in a communication system is provided). The method comprises transmitting a first message to a Mobile Station (MS), wherein the first message includes information related to a random access resource that is allocated to the MS by a target BS, and wherein the random access resource is distinguishable from other random access resources of the target BS.

36 Claims, 5 Drawing Sheets

(56) References Cited

U.S. PATENT DOCUMENTS

| | | |
|---|---|---|
| 2009/0109923 A1 | 4/2009 | Kojima |
| 2010/0272043 A1 | 10/2010 | Cho et al. |
| 2011/0002303 A1 | 1/2011 | Cho et al. |
| 2011/0013595 A1 | 1/2011 | Park et al. |
| 2011/0051688 A1 | 3/2011 | Lee et al. |
| 2011/0103325 A1* | 5/2011 | Cho et al. ............... 370/329 |
| 2011/0149912 A1 | 6/2011 | Jung et al. |
| 2011/0183674 A1 | 7/2011 | Lee et al. |
| 2011/0216735 A1 | 9/2011 | Venkatachalam et al. |
| 2011/0319013 A1 | 12/2011 | Jung et al. |
| 2012/0106515 A1 | 5/2012 | Cho et al. |
| 2012/0201225 A1* | 8/2012 | Jung et al. ............... 370/331 |

FOREIGN PATENT DOCUMENTS

| | | |
|---|---|---|
| KR | 10-2010-0025474 A | 3/2010 |
| KR | 10-2010-0029027 A | 3/2010 |
| WO | 2009/157650 A2 | 12/2009 |
| WO | 2010024591 A2 | 3/2010 |
| WO | 2010027176 A2 | 3/2010 |
| WO | 2010/050755 A2 | 5/2010 |

\* cited by examiner

METHOD AND APPARATUS FOR PERFORMING HANDOVER IN A WIRELESS COMMUNICATION SYSTEM

PRIORITY

This application is a continuation application of a prior application Ser. No. 13/169,264, filed on Jun. 27, 2011, which claimed priority under 35 U.S.C. §119(a) of a Korean patent application filed in the Korean Intellectual Property Office on Jun. 25, 2010 and assigned Serial No. 10-2010-0060437, the entire contents of which are incorporated herein by reference.

BACKGROUND OF THE INVENTION

1. Field of the Invention

The present invention relates to a method and apparatus for performing a handover in a wireless communication system.

2. Description of the Related Art

In a wireless communication system, basic control channels are used for communication between a Base Station (BS) and a Mobile Station (MS). The basic control channels include a downlink preamble channel for delivering information needed for system synchronization, a downlink broadcast channel for delivering system information, and an uplink Ranging CHannel (RCH) for providing information used for an MS to enter a network.

Ranging is a process of periodically matching an accurate timing offset and adjusting power between a BS and an MS. The MS performs ranging during network entry, for example. The RCH carries information required for ranging. Although RCHs are typically allocated periodically, additional RCHs may be allocated dynamically when a large number of MSs are expected to enter the network.

FIGS. 1A and 1B illustrate exemplary frame structures to which RCHs are allocated, in a case of handover in a wireless communication system according to the related art.

FIG. 1A illustrates a frame structure for a BS A, and FIG. 1B illustrate a frame structure for BS B. Reference numerals 101 and 121 denote downlink frames for BS A and BS B, respectively. Reference numerals 103 and 123 denote uplink frames for BS A and BS B, respectively.

Referring to FIGS. 1A and 1B, BS A allocates an RCH 113 to the uplink frame 103 using a broadcast channel, SuperFrame Header (SFH) 105. When BS A determines to dynamically allocate additional RCHs, BS A may allocate RCHs 117 and 119 to the uplink frame 103 using MAPs 109 and 111 including dynamic resource allocation information.

The MAPs 109 and 111 that dynamically allocate the RCHs 117 and 119 are accessible to all users and the RCHs 117 and 119 are also available to all users.

In a situation such as handover, BS A may allocate a specific RCH to a specific MS. If an MS is to perform handover from BS B to BS A (i.e., a target BS), BS B may allocate an RCH 115 for the MS to use within BS A by unicasting a specific message, for example, a HandOver CoMmanD (HO-CMD) message 107 to the MS. The RCH 115 is determined through negotiation with BS A or under the control of a higher-layer controller.

Because the HO-CMD message 107 is unicast, all other MSs within BS A cannot receive information about the RCH 115 allocated to the handover MS.

In the illustrated case of FIG. 1, there are four RCHs 113, 115, 117, and 119. In general, the RCHs 113, 115, 117, and 119 are sequentially indexed from 0 to 3 in a frequency order or in a time order. The RCH indexing is performed individually by each of the BS and MSs according to their allocation information, not signaled between them.

Without knowledge of allocation information about the RCH 115 allocated by unicasting the HO-CMD message 107 to the handover MS, other MSs within BS A index the RCHs 113, 117, and 119 sequentially with 0, 1, and 2. On the other hand, BS A indexes the RCHs 113, 115, 117, and 119 sequentially with 0 to 3. As BS A and the MSs within BS A label the RCHs with different indexes, there may be an RCH identification mismatch between BS A and the MSs.

SUMMARY OF THE INVENTION

Aspects of the present invention are to address at least the above-mentioned problems and/or disadvantages and to provide at least the advantages described below. Accordingly, an aspect of the present invention is to provide a method and apparatus for performing a handover in a wireless communication system.

Another aspect of the present invention is to provide a method and apparatus for allocating a Ranging CHannel (RCH) in a wireless communication system.

Another aspect of the present invention is to provide a method and apparatus for, when an RCH is dynamically allocated, enabling a Base Station (BS) and a Mobile Station (MS) to identify the RCH using the same index in a wireless communication system.

Another aspect of the present invention is to provide a method and apparatus for, when an RCH is allocated dynamically to an MS, enabling the MS to determine whether it uses the right RCH by checking information about the position of the allocated RCH in a wireless communication system.

A further aspect of the present invention is to provide a format for a message used by a BS during allocation of an RCH in a wireless communication system.

In accordance with an aspect of the present invention, a method for supporting a handover at a source BS in a wireless communication system is provided. The method includes transmitting a HandOver CoMmanD (HO-CMD) message to an MS. The HO-CMD message includes an RCH index of an RCH allocated to the MS by a target BS and a subframe index of the allocated RCH, and the RCH index of the allocated RCH does not overlap with indexes of other RCHs of the target BS.

In accordance with another aspect of the present invention, a method for supporting a handover at a target BS in a wireless communication system is provided. The method includes transmitting a HandOver Response (HO-RSP) message to a source BS. The HO-RSP message includes an RCH index of an RCH allocated to an MS by the target BS and a subframe index of the allocated RCH, and the RCH index of the allocated RCH does not overlap with indexes of other RCHs of the target BS.

In accordance with another aspect of the present invention, a method for performing a handover at an MS in a wireless communication system is provided. The method includes receiving an HO-CMD message from a serving BS. The HO-CMD message includes an RCH index of an RCH allocated to the MS by a target BS and a subframe index of the allocated RCH, and the RCH index of the allocated RCH does not overlap with indexes of other RCHs of the target BS.

In accordance with another aspect of the present invention, a source BS in a wireless communication system is provided. The system includes a transmission unit for transmitting an HO-CMD message to an MS. The HO-CMD message includes an RCH index of an RCH allocated to the MS by a target BS and a subframe index of the allocated RCH, and the RCH index of the allocated RCH does not overlap with indexes of other RCHs of the target BS.

In accordance with another aspect of the present invention, a target BS in a wireless communication system is provided. The system includes a transmission unit for transmitting an HO-RSP message to a source BS. The HO-RSP message includes an RCH index of an RCH allocated to an MS by the target BS and a subframe index of the allocated RCH, and the RCH index of the allocated RCH does not overlap with indexes of other RCHs of the target BS.

In accordance with another aspect of the present invention, an MS in a wireless communication system is provided. The system includes a reception unit for receiving an HO-CMD message from a serving BS. The HO-CMD message includes an RCH index of an RCH allocated to the MS by a target BS and a subframe index of the allocated RCH, and the RCH index of the allocated RCH does not overlap with indexes of other RCHs of the target BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompany drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While the following description is given in the context of an Institute of Electrical and Electronics Engineers (IEEE) 802.16m system, it is to be clearly understood that exemplary embodiments of the present invention are applicable to any wireless communication system requiring Ranging CHannel (RCH) allocation.

Figure 1A:
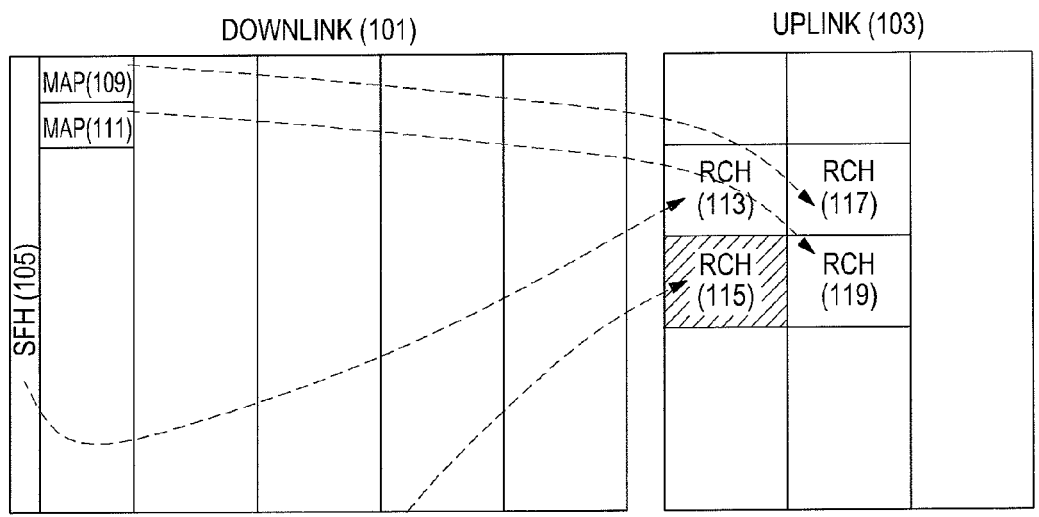
FIGS. 1A and 1B illustrate exemplary frame structures to which Ranging CHannels (RCHs) are allocated, in case of handover in a wireless communication system according to the related art.
Figure 1B:
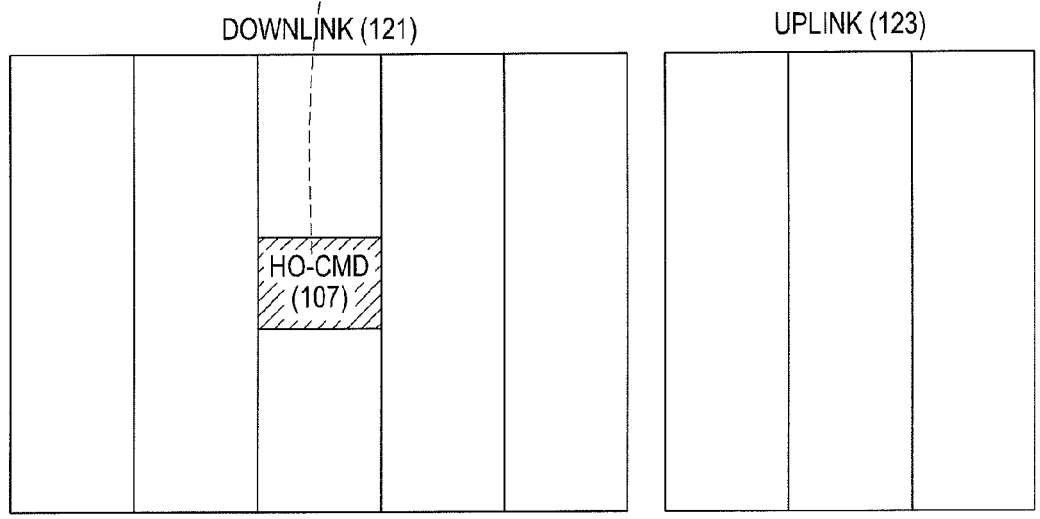
Figure 2A:
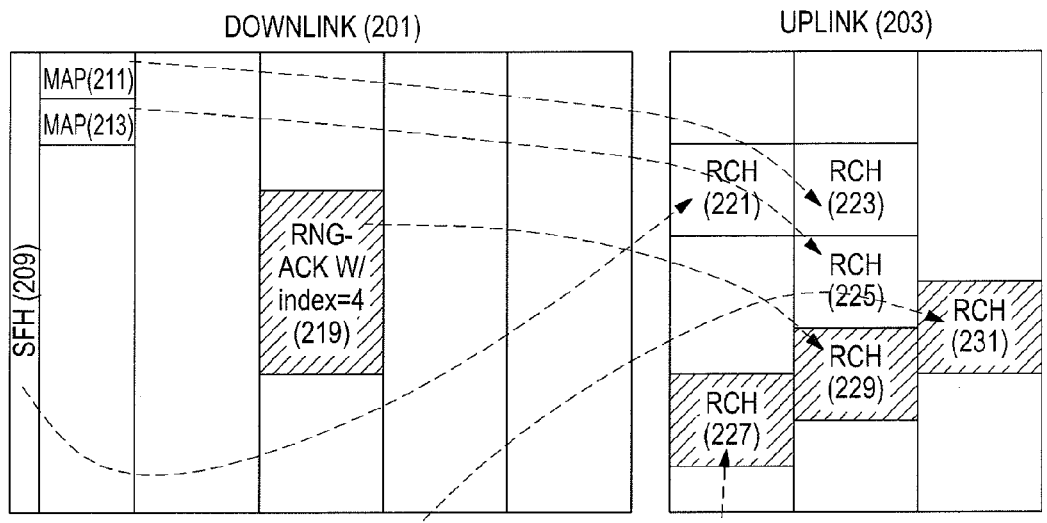
FIGS. 2A and 2B illustrate exemplary frame structures to which dynamic RCHs are allocated in a wireless communication system according to an exemplary embodiment of the present invention.
Figure 2B:
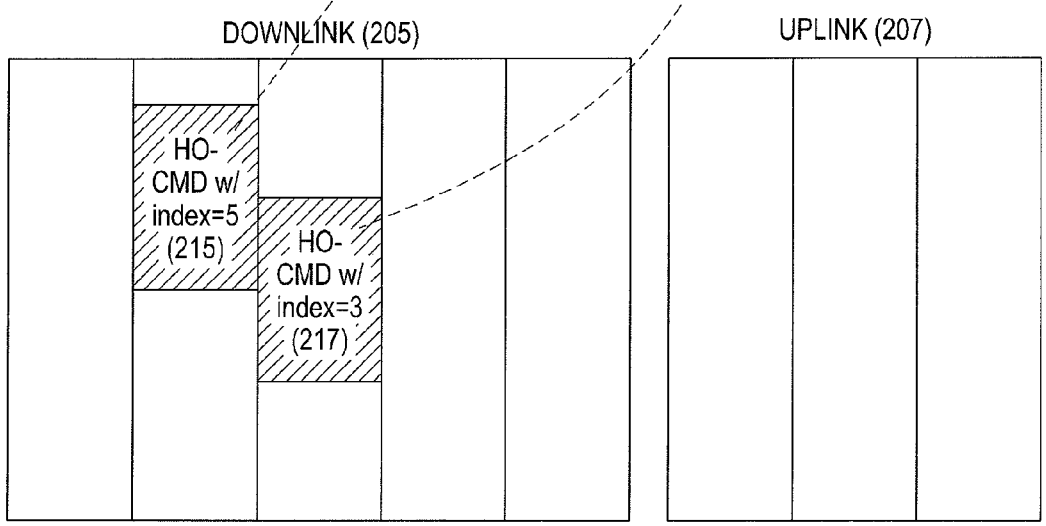

FIGS. 2A and 2B illustrate exemplary frame structures to which dynamic RCHs are allocated in a wireless communication system according to an exemplary embodiment of the present invention. FIG. 2A illustrates a frame structure for Base Station (BS) A. FIG. 2B illustrate a frame structure for BS B that is serving an MS attempting handover to BS A. Reference numerals 201 and 205 denote downlink frames of BS A and BS B, respectively and reference numerals 203 and 207 denote uplink frames of BS A and BS B, respectively.

Referring to FIGS. 2A and 2B, a frame is a resource allocation unit used by a BS. Frames are distinguished by frequency and time, each frame occupying part of resources available to the BS, as illustrated in FIGS. 2A and 2B.

BS A allocates an RCH 221 to the uplink frame 203 using a broadcast channel, SuperFrame Header (SFH) 209, for periodic RCH allocation. When BS A expects more MSs to enter BS A, BS A may allocate RCHs 223 and 225 dynamically using MAPs 211 and 213. Because the RCHs 221, 223, and 225 are allocated by the SFH 209 and the MAPs 211 and 213 in a broadcast manner, any MS within the service area of BS A can acquire allocation information about the RCHs 221, 223, and 225 and access the RCHs 221, 223, and 225 as well.

BS A may also allocate RCHs 227, 229, and 231 to specific MSs in a unicast manner. Unicast RCH allocation refers to transmission of information about an allocated RCH by a unicast message. When BS A allocates the RCH 229 to an MS operating within the service area of BS A and when BS A allocates the RCHs 227 and 231 to MSs entering BS A through BS B due to factors such as handover, unicast RCH allocation may be performed. For example, when it is necessary to allocate a dedicated RCH to a specific MS within BS A for periodic ranging, measurement of a neighbor BS, etc., the dedicated RCH may be allocated in the unicast manner.

When BS A allocates an RCH to the uplink frame 203 in the unicast manner, BS A assigns an RCH index to the RCH, for identification. The RCH index assigned to the RCH does not overlap with the indexes of existing RCHs in the uplink frame 203. Therefore, BS A and MSs within BS A can identify the unicast-allocated RCH using the same index.

For example, BS A may assign an index equal to or larger than the total number N of broadcast-allocated RCHs (N is 0 or a larger integer) to a unicast-allocated RCH. Given three broadcast-allocated RCHs 221, 223, and 225, they are sequentially indexed 0, 1, and 2. To avoid index overlapping, BS A always assigns index 3 or a larger index to an RCH allocated in the unicast manner. Accordingly, when BS A allocates the RCHs 227, 229 and 231, the BS A may directly assign indexes 3, 4, and 5 indicated by reference numerals 217, 219, and 215 to the RCHs 227, 229, and 231, respectively.

BS A may calculate the largest M of the indexes of the existing RCHs in the uplink frame 203 (M is 0 or a larger integer) and may directly assign index (M+1) or a larger index to each unicast-allocated RCH. The three RCHs 221, 223, and 225 are broadcast-allocated RCHs and have sequential indexes 0, 1, and 2. To avoid index overlapping, when BS A allocates an RCH in the unicast manner, BS A assigns index 3 or a larger index to the RCH by adding 1 to the largest of the existing RCH indexes, 2. Accordingly, when allocating the RCHs 227, 229, and 231, BS A may directly assign indexes 3, 4, and 5 to the RCHs 227, 229, and 231, respectively. The largest of the existing RCH indexes may be calculated by adding the number of the existing RCHs to (the starting RCH index-1).

Figure 3:
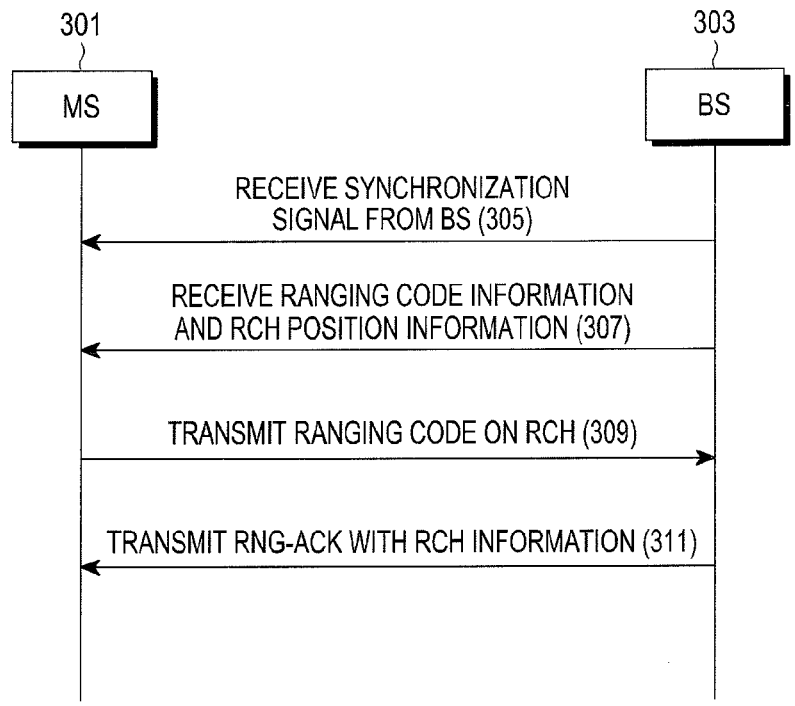
FIG. 3 is a diagram illustrating a signal flow when a Mobile Station (MS) attempts to enter a Base Station (BS) in a wireless communication system according to an exemplary embodiment of the present invention.

FIG. 3 is a diagram illustrating a signal flow when an MS attempts to enter a BS in a wireless communication system according to an exemplary embodiment of the present invention.

Referring to FIG. 3, an MS 301 acquires synchronization to a BS 303 by receiving a synchronization signal (i.e., a preamble channel) from the BS 303 in step 305.

In step 307, the BS 303 allocates an RCH to the MS 301 and the MS 301 receives from the BS 303 a message including information about at least one ranging code available to the MS for network entry, information about the position of the allocated RCH (i.e., the frame number and/or subframe number of the RCH), and the index of the RCH. The message may be broadcast to the MS 301 on a broadcast channel, or unicast to the MS 301.

The MS 301 receives the ranging code information, selects an available ranging code, and transmits the selected ranging code information in an RCH at a position indicated by the RCH position information to the BS 303 in step 309.

The BS 303 notifies the MS 301 whether the network entry of the MS 301 has been accepted by transmitting a RaNGing ReSPonse (RNG-RSP) (or a Ranging ACKnowledgment (RNG-ACK)) message in step 311. The BS 303 may allocate a plurality of RCHs to new MSs that are entering the network. When transmitting an RNG-RSP (or RNG-ACK) message to an MS, the BS 303 includes information about an RCH in which it has received a ranging code from the MS (i.e., information indicating the frame number and/or subframe number of the RCH and the index of the RCH in a frame) and information about the received ranging code in the RNG-RSP (or RNG-ACK) message.

As described above, if BS A transmits to an MS information about the position of an RCH allocated to the MS (i.e., the frame number, subframe number and index of the RCH) along with information about available ranging codes, the MS transmits a ranging code in the RCH and receives an RNG-RSP (or RNG-ACK) message from BS A. Since the RNG-RSP (or RNG-ACK) message indicates the RCH used by the MS (i.e., the index of the RCH used by the MS), the MS's malfunction can be prevented.

Now a description will be given of an example in which the RCHs 227 and 231 are allocated in the unicast manner by a HandOver CoMmanD (HO-CMD) message.

The RCH 227 or 231 is allocated in the unicast manner to an MS that is operating (being serviced) in another BS, BS A and attempting handover to the current BS, BS A (thus, a target BS). When the MS transmits a HandOver REQuest (HO-REQ) message to BS B due to weak signal strength of BS B, BS B notifies BS A that the MS will perform handover to BS A. The notification may be made by a message, for example, an HO-REQ message. If BS A accepts the handover of the MS, BS A allocates an RCH to the MS, assigns its index which does not overlap with the indexes of existing RCHs, and notifies BS B of the allocated RCH and the RCH index, along with an ACK message accepting the handover. BS B transmits information about the position of the RCH and the index of the RCH received from BS A to the MS in an HO-CMD message. Upon receipt of the HO-CMD message, the MS transmits a ranging code on the allocated RCH using the RCH index indicated by the HO-CMD message during network entry to BS A. After receiving an RNG-RSP (or RNG-ACK) message from BS A, the MS compares the RCH index indicated by the HO-CDM message with an RCH index indicated by the RNG-RSP (or RNG-ACK) message and thus determines whether the ranging code has been successfully transmitted to BS A according to the comparison.

Table 1 illustrates a format for an RNG-RSP (or RNG-ACK) message and an HO-CMD message according to an exemplary embodiment of the present invention.

TABLE 1

| Mandatory (M)/ Optional(O) | Attribute/Attribute arrangement | Size (bits) | Value/Description | Condition |
| --- | --- | --- | --- | --- |
| ... | | | | |
| O | Frame index | 4 | Indicates the frame index of the allocated ranging opportunity | Shall be included when a dynamic RCH is allocated |
| O | Subframe index | 2 | Indicates the subframe index of the allocated ranging opportunity | Shall be included when the dynamic RCH is allocated |

TABLE 1-continued

| Mandatory (M)/ Optional(O) | Attribute/Attribute arrangement | Size (bits) | Value/Description | Condition |
|---|---|---|---|---|
| O | Ranging Opportunity Index | 3 | Indicates the index of the ranging opportunity of the dynamic RCH. The ranging opportunity index shall not overlap with existing ranging opportunity indexes by the ABS. | Shall be included when Action Time refers to the frame to which the dynamic RCH is allocated. |
| ... | ... | ... ... | | ... |

The attributes of Table 1 should be added to a message (e.g., an RNK-ACK message) that a BS unicasts to an MS operating within the BS or a message (e.g., an HO-CMD message) that another BS transmits to an MS within another BS.

Frame index and Subframe index specify the position of the allocated RCH and Ranging Opportunity Index indicates the index of the RCH.

Figure 4:
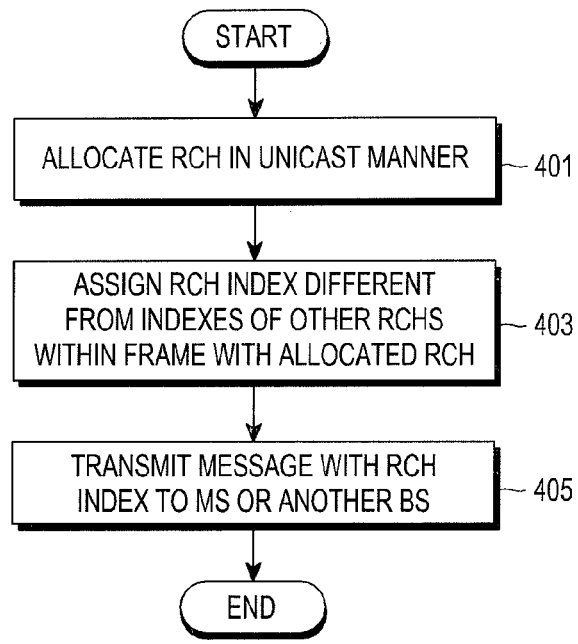
FIG. 4 is a flowchart illustrating an RCH allocation method of a BS in a wireless communication system according to an exemplary embodiment of the present invention.

FIG. 4 is a flowchart illustrating an RCH allocation method of a BS in a wireless communication system according to an exemplary embodiment of the present invention.

Referring to FIG. 4, when the BS intends to allocate a specific RCH to a specific MS, for example, where the specific MS is to range in a non-contention-based manner or requests handover to another BS, the BS allocates the RCH to the MS in a unicast manner in step 401.

In step 403, the BS assigns an index to the allocated RCH so that the RCH index does not overlap with the indexes of existing RCHs in an uplink frame of the BS.

Then the BS transmits a message for RCH allocation, including the RCH index, to the specific MS or the other BS that is serving the handover-requesting MS in step 405.

The message may be a ranging allocation message. The message may further include information about ranging codes available to the MS and the frame and subframe indexes of the allocated RCH. The ranging allocation message may be, for example, a HandOver ReSPonse (HO-RSP) message.

Figure 5:
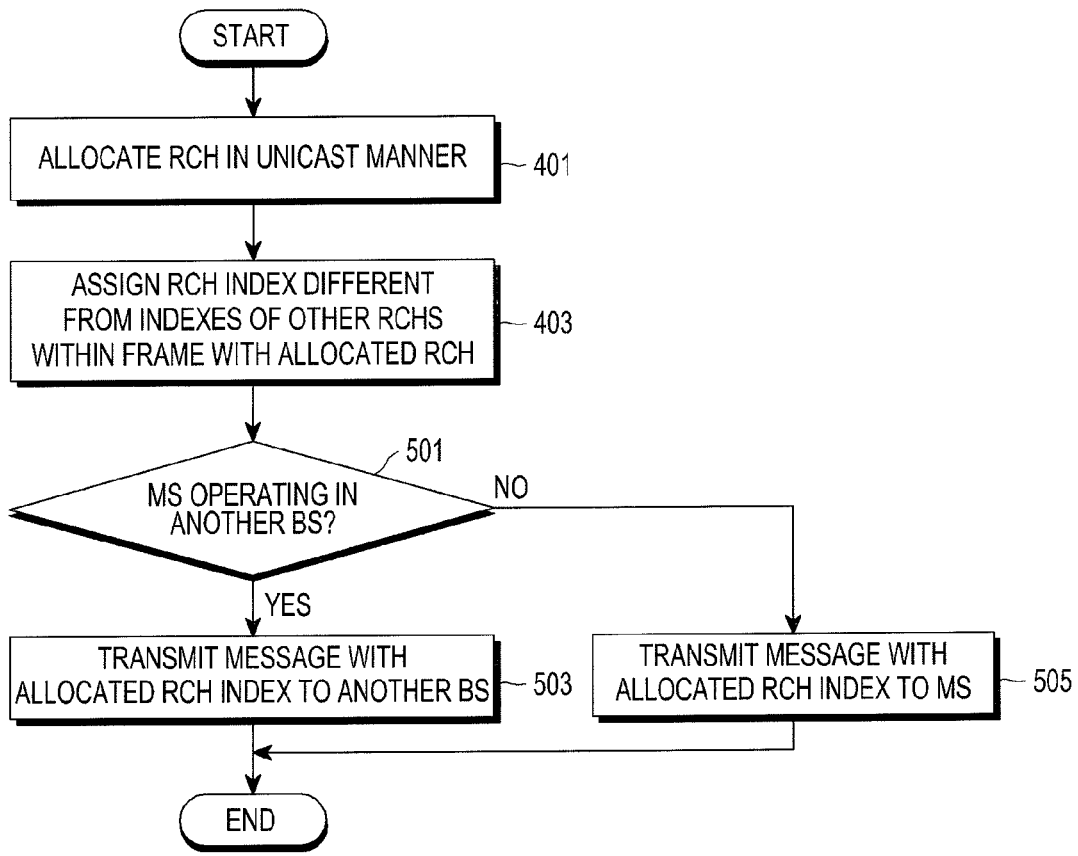
FIG. 5 is a flowchart illustrating an RCH allocation method of a BS in a wireless communication system according to an exemplary embodiment of the present invention.

FIG. 5 is a flowchart illustrating an RCH allocation method of a BS in a wireless communication system according to another exemplary embodiment of the present invention.

Referring to FIG. 5, when the BS intends to allocate a specific RCH to a specific MS, for example, when the specific MS is to range in a non-contention-based manner or requests handover to another BS, the BS allocates the RCH to the MS in a unicast manner in step 401. The BS is aware of the handover request of the MS within the service area of the other BS by receiving an HO-REQ message from the other BS. In step 403, the BS assigns an index to the allocated RCH so that the RCH index does not overlap with the indexes of existing RCHs in an uplink frame of the BS.

The BS determines whether the MS is operating in the other BS, that is, whether the MS has requested a handover in the other BS in step 501. If the MS is operating in the other BS, the BS transmits a message including the RCH index to the other BS in step 503 so that the other BS may transmit a message (such as an HO-CMD message) including the RCH index to the MS. On the other hand, if the MS is operating within the service area of the BS, the BS transmits a message (such as a ranging allocation message) including the RCH index to the MS in step 505.

The message with the RCH index may further include information about ranging codes available to the MS and the frame and subframe indexes of the allocated RCH.

Figure 6:
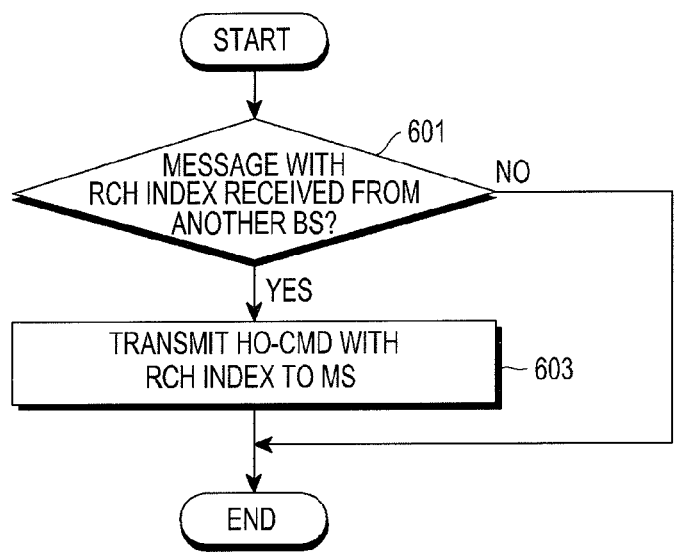
FIG. 6 is a flowchart illustrating an RCH allocation method, when a BS receives a ranging allocation message from another BS in a wireless communication system according to an exemplary embodiment of the present invention.

FIG. 6 is a flowchart illustrating an RCH allocation method, when a BS receives a ranging allocation message from another BS in a wireless communication system according to an exemplary embodiment of the present invention.

As described before with reference to FIG. 5, a BS may transmit a ranging allocation message to another BS that is serving a handover-requesting MS. The operation of FIG. 6 is performed in the case where a BS receives such a ranging allocation message.

Referring to FIG. 6, when a BS receives a message including an RCH index from another BS in step 601, the BS transmits a message including the RCH index to an MS to which an RCH corresponding to the RCH index has been allocated in step 603. The message including the RCH index may be an HO-CMD message.

Selectively, the message with the RCH index may further include information about ranging codes available to the MS and the frame and subframe indexes of the allocated RCH.

As illustrated in FIGS. 4, 5, and 6, an MS's malfunction of using an incorrect RCH can be prevented, as the MS receives a message including the index of an RCH allocated in a unicast manner.

Figure 7:
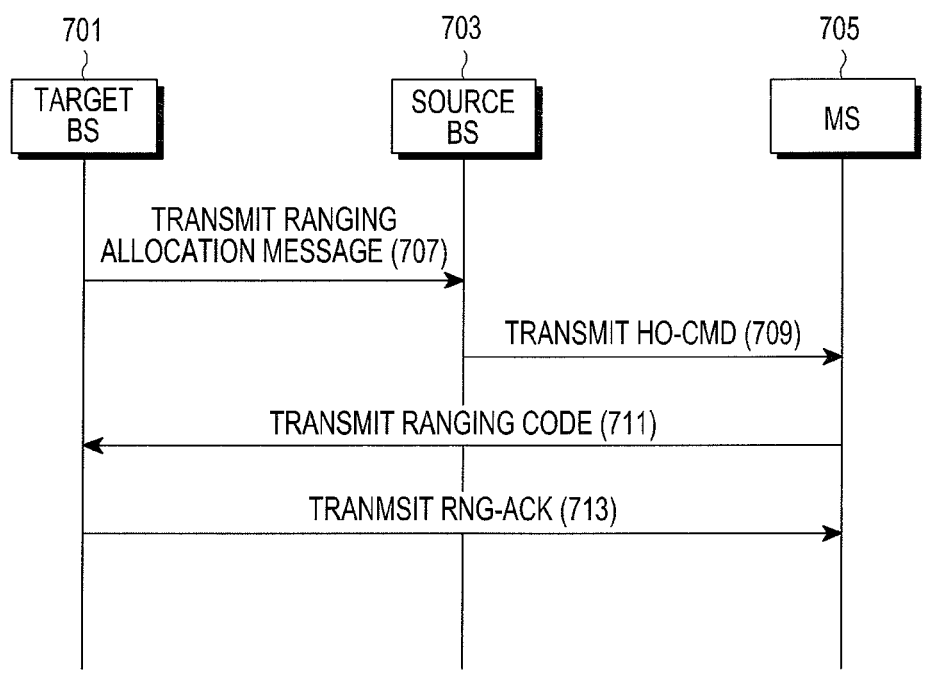
FIG. 7 is a diagram illustrating a signal flow between an MS and a BS during a handover attempt according to an exemplary embodiment of the present invention.

FIG. 7 is a diagram illustrating a signal flow between an MS and a BS during a handover attempt according to an exemplary embodiment of the present invention.

Referring to FIG. 7, when an MS 705 attempts a handover from a source BS 703 to a target BS 701, the source BS 703 notifies the target BS 701 of the handover of the MS 705. The target BS 701 then allocates an RCH to the MS 705 in a unicast manner, assigns an index to the RCH so that the RCH index does not overlap with the indexes of existing RCHs within the target BS 701, and transmits a ranging allocation message including the RCH index to the source BS 703 in step 707. Upon receipt of the ranging allocation message, the source BS 703 transmits an HOP-CMD message including the RCH index to the MS 705 in step 709. The MS 705 transmits a ranging code on the RCH corresponding to the RCH index to the target BS 701 in step 711. Upon receipt of the ranging code, the target BS 701 transmits an RNG-RSP (or RNG-ACK) message to the MS 705 in response to the ranging code in step 713.

In accordance with an exemplary embodiment of the present invention, the BS may include an RCH allocation unit for managing RCH allocations and a wireless signal processor for processing wireless transmission and reception signals. The operations of FIGS. 4, 5, and 6 may be implemented in the RCH allocation unit of the BS. The RCH allocation unit may include a controller and a signal Input/

Output (I/O) unit. The controller provides overall control to the RCH allocation methods of FIGS. 4, 5, and 6, and the signal I/O unit receives and outputs a plurality of messages and data from and to the controller using the wireless signal processor.

In accordance with an exemplary embodiment of the present invention, the MS may include a controller for controlling reception of a ranging allocation message or an HO-CMD message from a BS and controlling transmission of a ranging code to a BS, and a signal I/O unit for transmitting and receiving messages or signals to and from a BS under the control of the controller. The operations of the MS illustrated in FIGS. 3 to 7 may be implemented in the controller and the signal I/O unit of the MS.

The RCH allocation frame structure of FIG. 2, the message flows illustrated in FIGS. 3 and 7, and the flowcharts illustrated in FIGS. 4, 5, and 6, should not be construed as limiting the scope and spirit of the present invention. The resource allocation methods of FIGS. 3 to 7 are merely examples of operations of the RCH allocation unit (not shown) and the MS (not shown). These methods may not involve all steps or may not be performed individually by a particular device. They may be implemented by a single device or component.

The afore-described operations can be performed by providing a memory that stores program code in a component of a controller or an MS. Each component of the controller or the MS can perform the operations by reading the program code from the memory by means of a processor or a Central Processing Unit (CPU) and executing the program code.

As is apparent from the above description of the present invention, because a BS assigns an index to a dynamically allocated RCH in such a manner that the RCH index does not overlap with the indexes of existing RCHs, a malfunction that might otherwise occur due to an RCH index collision between the BS and an MS can be prevented.

In addition, upon receipt of a ranging code from the MS, the BS notifies the MS of an RCH in which it has received the ranging code. Accordingly, the MS can determine the position of an RCH allocated to the MS. As a consequence, a ranging procedure can be completed without a wrong RCH use-caused malfunction.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An operating method of a serving base station (BS) in a communication system, the operating method comprising:
   transmitting, by the serving BS, a first message to a mobile station (MS),
   wherein the first message includes information related to a random access resource that is allocated to the MS by a target BS and a subframe index of the allocated random access resource, and
   wherein the random access resource does not collide with random access resources allocated to other MSs associated with the target BS.

2. The operating method of claim 1, wherein the first message includes a handover command (HO-CMD) message.

3. The operating method of claim 1, wherein the information related to the random access resource includes information related to a ranging channel (RCH) index of an RCH allocated to the MS by the target BS.

4. The operating method of claim 1, further comprising: receiving, by the serving BS, a second message from the target BS, the second message including the information related to the random access resource which is allocated to the MS.

5. The operating method of claim 4, wherein the first message transmitted to the MS includes a handover command (HO-CMD) message, and the second message received from the target BS includes a handover response (HO-RSP) message.

6. The operating method of claim 4, wherein the information related to the random access resource includes information related to a ranging channel (RCH) index of an RCH allocated to the MS by the target BS.

7. An operating method of a target base station (BS) in a communication system, the operating method comprising:
   transmitting, by the target BS, a first message to a serving BS,
   wherein the first message includes information related to a random access resource allocated to a mobile station (MS) by the target BS and a subframe index of the allocated random access resource, and
   wherein the random access resource does not collide with random access resources allocated to other MSs associated with the target BS.

8. The operating method of claim 7, wherein the first message includes a handover response (HO-RSP) message.

9. The operating method of claim 7, wherein the information related to the random access resource includes information related to a ranging channel (RCH) index of an RCH allocated to the MS by the target BS.

10. The operating method of claim 7, further comprising:
    allocating, by the target BS, the random access resource to the MS, in response to receiving a second message from the serving BS, the second message indicating a handover of the MS to the target BS from the serving BS.

11. The operating method of claim 10, wherein the first message transmitted to the serving BS includes a handover response (HO-RSP) message, and the second message received from the serving BS includes a handover request (HO-REQ) message.

12. The operating method of claim 10, wherein the information related to the random access resource includes information related to a ranging channel (RCH) index of an RCH allocated to the MS by the target BS.

13. An operating method of mobile station (MS) in a communication system, the operating method comprising:
    receiving, by the MS, a first message from a serving base station (BS),
    wherein the first message includes information related to a random access resource which is allocated to the MS by a target BS and a subframe index of the allocated random access resource, and
    wherein the random access resource does not collide with random access resources allocated to other MSs associated with the target BS.

14. The operating method of claim 13, wherein the first message includes a handover command (HO-CMD) message.

15. The operating method of claim 13, wherein the information related to the random access resource includes information related to a ranging channel (RCH) index of an RCH allocated to the MS by the target BS.

16. The method of claim 13, further comprising:
transmitting, by the MS, a second message to the serving BS indicating a handover of the MS to the target BS.

17. The operating method of claim 16, wherein the first message includes a handover command (HO-CMD) message, and the second message transmitted includes a handover request (HO-REQ) message.

18. The operating method of claim 16, wherein the information related to the random access resource includes information related to a ranging channel (RCH) index of an RCH allocated to the MS by the target BS.

19. A serving base station (BS) in a communication system, the serving BS comprising:
a transmitter configured to transmit a first message to a mobile station (MS),
wherein the first message includes information related to a random access resource which is allocated to the MS by a target BS and a subframe index of the allocated random access resource, and
wherein the random access resource does not collide with random access resources allocated to other MSs associated with the target BS.

20. The serving BS of claim 19, wherein the first message includes a handover command (HO-CMD) message.

21. The serving BS of claim 19, wherein the information related to the random access resource includes information related to a ranging channel (RCH) index of an RCH allocated to the MS by the target BS.

22. The serving BS of claim 19, further comprising:
a receiver configured to receive a second message from the BS, the second message including the information related to the random access resource which is allocated to the MS.

23. The serving BS of claim 22, wherein the first message transmitted to the MS includes a handover command (HO-CMD) message, and the second message received from the target BS includes a handover response (HO-RSP) message.

24. The serving BS of claim 22, wherein the information related to the random access resource includes information related to a ranging channel (RCH) index of an RCH allocated to the MS by the target BS.

25. A target base station (BS) in a communication system, the target BS comprising:
a transmitter configured to transmit a first message to a serving BS,
wherein the first message includes information related to a random access resource allocated to a mobile station (MS) by the target BS and a subframe index of the allocated random access resource, and
wherein the random access resource does not collide with random access resources allocated to other MSs associated with the target BS.

26. The target BS of claim 25, wherein the first message includes a handover response (HO-RSP) message.

27. The target BS of claim 25, wherein the information related to the random access resource includes information related to a ranging channel (RCH) index of an RCH allocated to the MS by the target BS.

28. The target BS of claim 25, further comprising:
a controller configured to allocate the random access resource to the MS if a receiver receives a second message from the serving BS, the second message indicating a handover of the MS to the target BS.

29. The target BS of claim 28, wherein the first message transmitted to the serving BS includes a handover response (HO-RSP) message, and the second message received from the serving BS includes a handover request (HO-REQ) message.

30. The target BS of claim 28, wherein the information related to the random access resource includes information related to a ranging channel (RCH) index of an RCH allocated to the MS by the target BS.

31. A mobile station (MS) in a communication system, the MS comprising:
a receiver configured to receive a first message from a serving base station (BS),
wherein the first message includes information related to a random access resource which is allocated to the MS by a target BS and a subframe index of the allocated random access resource, and
wherein the random access resource does not collide with random access resources allocated to other MSs associated with the target BS.

32. The MS of claim 31, wherein the first message includes a handover command (HO-CMD) message.

33. The MS of claim 31, wherein the information related to the random access resource includes information related to a ranging channel (RCH) index of an RCH allocated to the MS by the target BS.

34. The MS of claim 31, further comprising:
a transmitter configured to transmit a second message to the serving BS, the second message indicating a handover of the MS to the target BS to the serving BS.

35. The MS of claim 34, wherein the first message received from the serving BS includes a handover command (HO-CMD) message, and the second message transmitted to the serving BS includes a handover request (HO-REQ) message.

36. The MS of claim 34, wherein the information related to the random access resource includes information related to a ranging channel (RCH) index of an RCH allocated to the MS by the target BS.

* * * * *